United States Patent
Zhang et al.

(10) Patent No.: US 11,769,242 B2
(45) Date of Patent: Sep. 26, 2023

(54) MODE SELECTION AND DEFECT DETECTION TRAINING

(71) Applicant: KLA Corporation, Milpitas, CA (US)

(72) Inventors: Jing Zhang, Santa Clara, CA (US);
Yujie Dong, Pleasanton, CA (US);
Vishank Bhatia, Milpitas, CA (US);
Patrick McBride, Davis, CA (US);
Kris Bhaskar, San Jose, CA (US);
Brian Duffy, San Jose, CA (US)

(73) Assignee: KLA Corporation, Milpitas, CA (US)

( * ) Notice: Subject to any disclaimer, the term of this patent is extended or adjusted under 35 U.S.C. 154(b) by 465 days.

(21) Appl. No.: 17/128,502

(22) Filed: Dec. 21, 2020

(65) Prior Publication Data
US 2021/0366103 A1   Nov. 25, 2021

Related U.S. Application Data

(60) Provisional application No. 63/027,975, filed on May 21, 2020.

(51) Int. Cl.
*G06T 7/00* (2017.01)
*G01N 21/95* (2006.01)

(52) U.S. Cl.
CPC ....... *G06T 7/0004* (2013.01); *G01N 21/9501* (2013.01); *G06T 2207/20081* (2013.01); *G06T 2207/20084* (2013.01); *G06T 2207/30148* (2013.01)

(58) Field of Classification Search
CPC ......... G06T 7/0004; G06T 2207/20081; G06T 2207/20084; G06T 2207/30148; G01N 21/9501; G01N 21/8851; G01N 2021/8854; G01N 2021/8883; G01N 2021/8887; G01N 2201/1296; G06N 5/01; G06N 3/082
See application file for complete search history.

(56) References Cited

U.S. PATENT DOCUMENTS

| 7,877,722 | B2 | 1/2011 | Duffy et al. |
| 10,346,740 | B2 | 7/2019 | Zhang et al. |
| 10,354,929 | B2 | 7/2019 | Pandev |
| 2018/0060702 | A1 | 3/2018 | Ma et al. |
| 2018/0075594 | A1 | 3/2018 | Brauer |

(Continued)

OTHER PUBLICATIONS

Finn, Chelsea et al., "Model-Agnostic Meta-Learning for Fast Adaption of Deep Networks", Jul. 18, 2017, 13 pages.

(Continued)

*Primary Examiner* — Bobbak Safaipour
(74) *Attorney, Agent, or Firm* — Suiter Swantz pc llo

(57) ABSTRACT

A system may be configured for joint defect discovery and optical mode selection. Defects are detected during a defect discovery step. The discovered defects are accumulated into a mode selection dataset. The mode selection dataset is used to perform mode selection to determine a mode combination. The mode combination may then be used to train the defect detection model. Additional defects may then be detected by the defect detection model. The additional defects may then be provided to the mode selection dataset, for further performing mode selection and training the defect detection model. One or more run-time modes may then be determined. The system may be configured for mode selection and defect detection at an image pixel level.

20 Claims, 8 Drawing Sheets

(56) References Cited

U.S. PATENT DOCUMENTS

| | | |
|---|---|---|
| 2018/0107928 A1 | 4/2018 | Zhang et al. |
| 2020/0025689 A1 | 1/2020 | Gaind et al. |
| 2020/0083130 A1 | 3/2020 | Tsao et al. |
| 2020/0126212 A1 | 4/2020 | Duffy et al. |
| 2020/0132610 A1 | 4/2020 | Brauer |
| 2020/0134810 A1 | 4/2020 | Lee et al. |
| 2020/0143528 A1 | 5/2020 | Kulkarni et al. |
| 2022/0147871 A1* | 5/2022 | Frikha .............. G05B 19/41865 |

OTHER PUBLICATIONS

Jacobs, Robert A. et al., "Adaptive Mixtures of Local Experts", Received Jul. 27, 1990 and Accepted Nov. 1, 1990, 9 pages.
PCT International Search Report and Written Opinion for International Application No. PCT/US2021/032661 dated Aug. 12, 2021, 10 pages.

* cited by examiner

MODE SELECTION AND DEFECT DETECTION TRAINING

CROSS-REFERENCE TO RELATED APPLICATION

The present application claims the benefit under 35 U.S.C. § 119(e) of U.S. Provisional Application Ser. No. 63/027,975, filed May 21, 2020, which is incorporated herein by reference in its entirety.

TECHNICAL FIELD

The present invention generally relates to semiconductor inspection, and more specifically to classifying defects detected by semiconductor inspection.

BACKGROUND

Semiconductor production environments are typically highly controlled to suppress contamination of wafers with foreign materials that may interfere with the fabrication process or degrade the performance of fabricated devices. Inspection systems are commonly used to locate defects such as, but not limited to, foreign particles on a substrate for screening and avoidance measures. The sensitivity of defect inspection may vary based on factor such as, but not limited to, a defect type, the measurement parameters, or a defect detection model. Identification of suitable measurement parameters and defect detection models may thus present a challenge.

Therefore, it would be advantageous to provide a system and method that cures the shortcomings described above.

SUMMARY

A system is disclosed, in accordance with one or more illustrative embodiments of the present disclosure. In one illustrative embodiment, the system includes a controller. In another illustrative embodiment, the controller is communicatively coupled to an inspection sub-system. In another illustrative embodiment, the inspection sub-system is configured to image at least one sample while being configured with any of a plurality of candidate optical modes. In another illustrative embodiment, the controller includes one or more processors configured to execute program instructions causing the one or more processors to jointly perform optical mode selection and defect detection training. In another illustrative embodiment, the processors receive defect data of at least one defect on at least a portion of the at least one sample. In another illustrative embodiment, the processors receive at least one image from the inspection sub-system and store the at least one image in a dataset. In another illustrative embodiment, the processors select one or more optical modes from the plurality of candidate modes by performing a mode selection model. In another illustrative embodiment, the processors train a defect detection model with the images associated with the one or more optical modes selected by the mode selection model. In another illustrative embodiment, the processors are further configured to determine at least one run-time optical mode from the plurality of candidate optical modes.

A method is disclosed, in accordance with one or more illustrative embodiments of the present disclosure. The method may include performing optical mode selection and defect detection training. In one illustrative embodiment, the method includes receiving defect data of at least one defect on at least a portion of at least one sample. In another illustrative embodiment, the method includes receiving at least one image from an inspection sub-system and storing the at least one image in a dataset. In another illustrative embodiment, the method includes selecting one or more optical modes from the plurality of candidate optical modes by performing a mode selection model. In another illustrative embodiment, the method includes training a defect detection model with the images associated with the one or more optical modes selected by the mode selection model. In another illustrative embodiment, the method includes performing a defect inspection test.

A system is disclosed, in accordance with one or more illustrative embodiments of the present disclosure. In one illustrative embodiment, the system includes an inspection sub-system configured to image at least one sample while being configured with a plurality of candidate optical modes. In another illustrative embodiment, the system includes a controller communicatively coupled to the inspection sub-system. In another illustrative embodiment, the controller includes one or more processors configured to execute program instructions causing the one or more processors to jointly perform optical mode selection and defect detection training. In another illustrative embodiment, the processors receive defect data of at least one defect on at least a portion of the at least one sample. In another illustrative embodiment, the processors receive at least one image from the inspection sub-system and store the at least one image in a dataset. In another illustrative embodiment, the processors select one or more optical modes from the plurality of candidate modes by performing a mode selection model. In another illustrative embodiment, the processors train a defect detection model with the images associated with the one or more optical modes selected by the mode selection model. In another illustrative embodiment, the processors are further configured to determine at least one run-time optical mode from the plurality of candidate optical modes.

BRIEF DESCRIPTION OF THE DRAWINGS

The numerous advantages of the disclosure may be better understood by those skilled in the art by reference to the accompanying figures in which.

DETAILED DESCRIPTION OF THE INVENTION

Figure 1A:
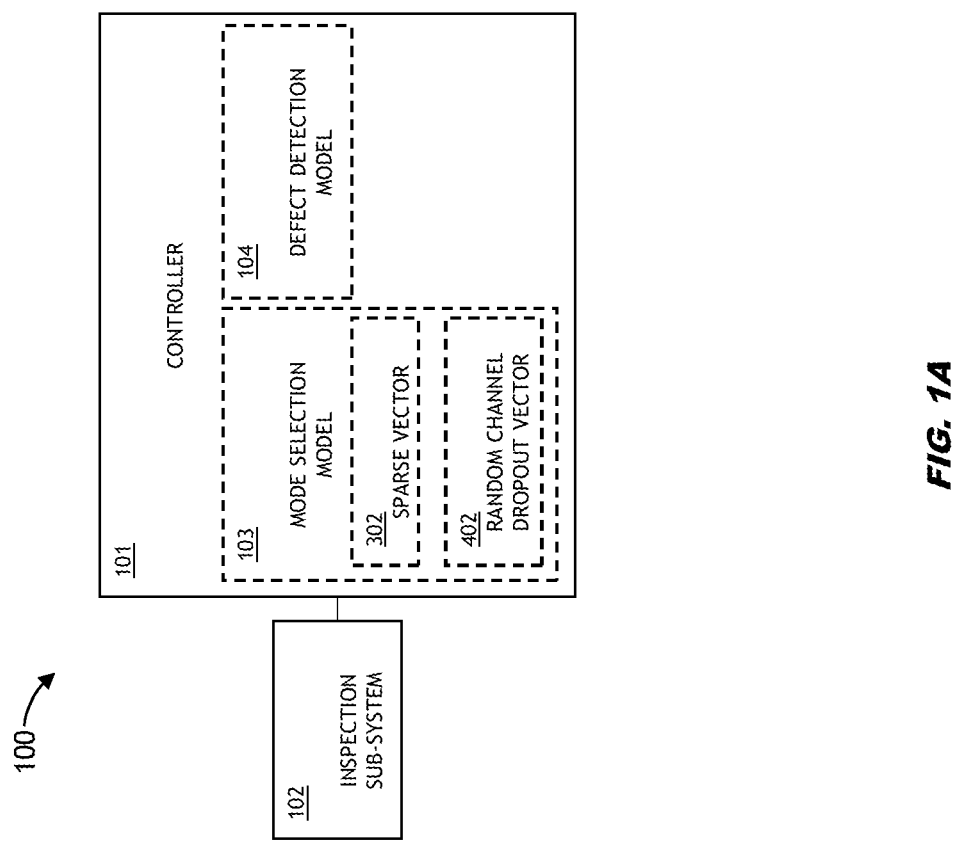
FIG. 1A is a conceptual view of an image-based optical inspection system, in accordance with one or more embodiments of the present disclosure.

Reference will now be made in detail to the subject matter disclosed, which is illustrated in the accompanying drawings.

Defect inspection may be performed on a sample using a wide range of tools, including optical inspection tools or electron beam tools. Generally, optical inspection tools may provide a higher-throughput while electron beam tools may provide a higher resolution. The optical inspection tool may include one or more adjustable optical characteristics. A combination of the optical characteristics of the inspection tool may be referred to as a recipe or optical mode, such optical characteristics including, but not limited not limited to, a wavelength, a focal length, an aperture, or a bandwidth. Optical inspection tools may include several hundred or thousand optical modes, where some optical modes of the optical inspection tool may produce images which are more or less suitable for defect detection.

Defect inspection may be performed to detect defects on images of the sample taken by the optical inspection tool by applying a defect detection model to the images. The defect inspection may include comparison of the images with one or more reference images (e.g., reference images taken by another tool, reference images taken by the optical inspection tool while configured with a different optical mode, reference images taken from another die on the sample reference images taken from one or more reference dies, a combination of one or more of the preceding reference images, etc.). Some defect detection models may be more or less suitable for detecting defects on an image taken at a given optical mode. Therefore, it is desirable to have an optical mode and a defect detection model which may cooperatively detect defects on a sample during a production step or other run-time environment. In a general sense, any number of optical modes may be utilized to inspect a sample during runtime. However, inspection with different optical modes during runtime typically negatively impacts production throughput. As a result, the number of optical modes utilized during runtime is typically limited (e.g., to 1-3 modes). However, it may be difficult to determine a priori a suitable combination of the optical mode and defect detection model.

Embodiments of the present disclosure are directed to joint defect discovery and optical mode selection. A data sufficiency of optical mode selection during defect training may be addressed by performing joint defect discovery and optical mode selection. Additionally, optical mode selection may be scalable for a desired number of candidate optical modes.

The joint defect discovery and optical mode selection may include determining one or more defects (e.g., defects of interest (DOI)) on a sample. Furthermore, an inspection sub-system may generate one or more images associated with the defects, with such inspection sub-system being configured with an optical mode. The images and the associated defects may be accumulated into a mode selection dataset. The mode selection dataset may be used by a mode selection algorithm to determine one or more optical modes. The one or more optical modes may then be used to train a defect detection model. The one or more optical modes may optionally be used by the optical inspection tool for performance evaluation at one or more of a die, a die rows, or a wafer scale. Defects discovered during the performance evaluation may further be accumulated in the mode selection dataset for a subsequent iterative loop.

In embodiments, the defect discovery and optical mode selection may be performed in an iterative manner. By iteratively performing the defect discovery and optical mode selection, a defect detection model may be trained and at least one optical mode may be selected. During a run-time environment, at least one image of the sample may be taken by the inspection sub-system using the at least one optical mode, and one or more defects may be detected in the at least one image by the defect detection model. Furthermore, defect detection using the defect detection model may be performed with a desired level of sensitivity and stability.

Systems and methods for creating inspection recipes is described in U.S. Pat. No. 7,877,722, by Brian Duffy, which is incorporated herein by reference in its entirety.

Multimode defect classification in semiconductor inspection is described in U.S. patent application Ser. No. 16/272,528, published as US 2020/0025689, by Vaibhav Gaind, which is incorporated herein by reference in its entirety.

Referring generally to FIGS. 1A-5, a system 100 and a method 200 are disclosed, in accordance with one or more embodiments of the present disclosure.

FIG. 1A is a conceptual view illustrating an image-based optical inspection system 100, in accordance with one or more embodiments of the present disclosure.

The system 100 may include, but is not limited to, an inspection sub-system 102. The inspection sub-system 102 may be configured in a plurality of candidate optical modes. For example, in an optical mode of the plurality of candidate optical modes, individual overlay target elements may be resolvable within the illuminated spot on the sample (e.g., as part of a bright-field image, a dark-field image, a phase-contrast image, or the like). The optical mode may include a combination of optical characteristics of the inspection sub-system. The optical mode of the inspection sub-system 102 may include, but is not limited to, an illumination wavelength, a detected wavelength of radiation emanating from the sample, a spot size of illumination on the sample, an angle of incident illumination, a polarization of incident illumination, a focal length, a position of a beam of incident illumination on an overlay target, or a transmission distribution in a collection aperture. In this regard, the optical mode may be associated with a recipe of the inspection sub-system 102. For example, an optical mode includes an aperture, a wavelength, and a polarization. If ten different apertures, ten different wavelengths, and three polarizations are considered, then there are three hundred possible optical modes (e.g., candidate optical modes).

In embodiments, the controller 101 is communicatively coupled to the inspection sub-system 102. In another embodiment, the controller 101 is configured to generate and provide one or more control signals configured to perform one or more adjustments to one or more portions of the inspection sub-system 102 (e.g., adjust a wavelength of the inspection sub-system 102).

In embodiments, the controller 101 may also be configured to receive image data from the inspection sub-system 102. The controller 101 may also be configured to execute any of the various steps discussed further herein. For example, the controller may include a mode selection model 103 and a defect detection model 104. By the mode selection model 103 and the defect detection model 104, the controller 101 may jointly perform optical mode selection and defect discovery. The joint optical mode selection and defect discovery may address data insufficiency associated with optical mode selection (e.g., when not all optical modes have an associated image). Furthermore, the defect detection model 104 may be sufficiently scalable for training by a deep learning technique and may achieve sufficient detection when few defects are available. By jointly performing optical mode selection and defect discovery, one or more run-time optical modes may be determined together with a trained defect detection model which may then be provided to the inspection sub-system 102 during a run-time environment.

Figure 1B:
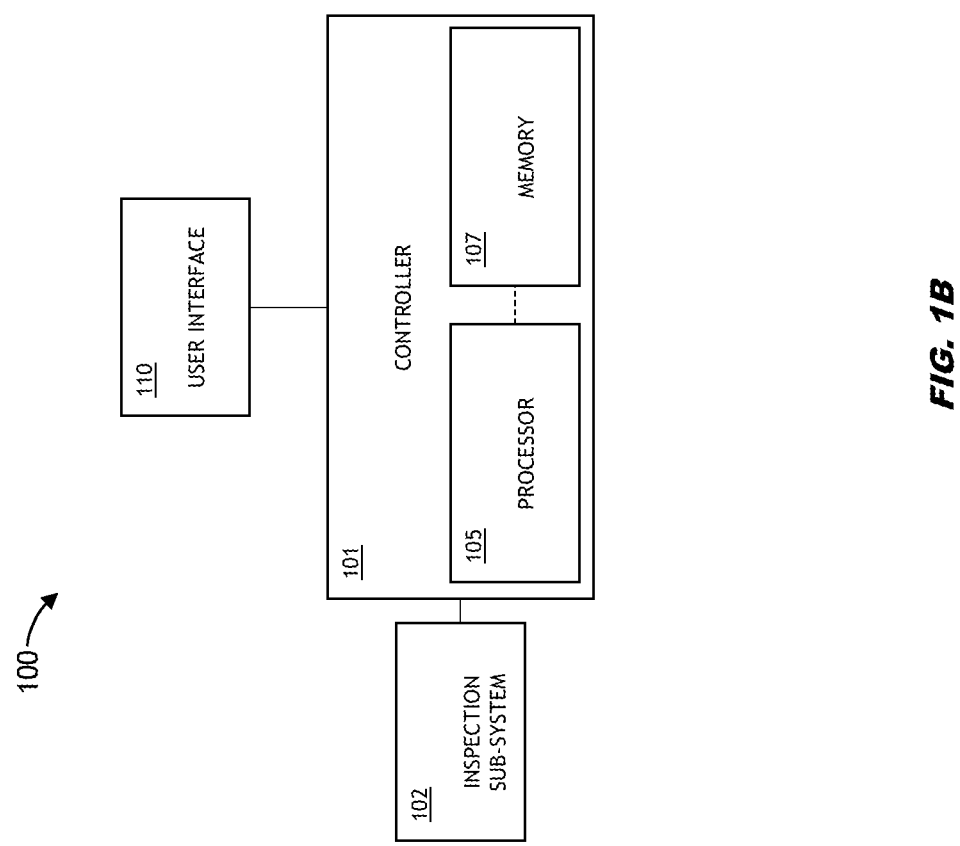
FIG. 1B is a conceptual view of an image-based optical inspection system, in accordance with one or more embodiments of the present disclosure.

FIG. 1B is a conceptual view illustrating the system, in accordance with one or more embodiments of the present disclosure.

The controller 101 may include one or more processors 105, a memory 107 and may include or be coupled to a user interface 110. The one or more processors 105 of controller 101 may execute any of the various process steps described throughout the present disclosure, such as, but not limited to, jointly performing mode selection and defect discovery.

The one or more processors 105 of the controller 101 may include any processor or processing element known in the art. For the purposes of the present disclosure, the term "processor" or "processing element" may be broadly defined to encompass any device having one or more processing or logic elements (e.g., one or more micro-processor devices, one or more application specific integrated circuit (ASIC) devices, one or more field programmable gate arrays (FPGAs), or one or more digital signal processors (DSPs)). In this sense, the one or more processors 105 may include any device configured to execute algorithms and/or instructions (e.g., program instructions stored in memory). In embodiments, the one or more processors 105 may be embodied as a desktop computer, mainframe computer system, workstation, image computer, parallel processor, networked computer, or any other computer system configured to execute a program configured to operate or operate in conjunction with the system 100, as described throughout the present disclosure. Moreover, different subsystems of the system 100 may include a processor or logic elements suitable for carrying out at least a portion of the steps described in the present disclosure. Therefore, the above description should not be interpreted as a limitation on the embodiments of the present disclosure but merely as an illustration. Further, the steps described throughout the present disclosure may be carried out by a single controller or, alternatively, multiple controllers. Additionally, the controller 101 may include one or more controllers housed in a common housing or within multiple housings. In this way, any controller or combination of controllers may be separately packaged as a module suitable for integration into system 100. Further, the controller 101 may analyze data received from the inspection sub-system 102 and feed the data to additional components within the system 100 or external to the system 100

The memory medium 107 may include any storage medium known in the art suitable for storing program instructions executable by the associated one or more processors 105. For example, the memory medium 107 may include a non-transitory memory medium. By way of another example, the memory medium 107 may include, but is not limited to, a read-only memory (ROM), a random-access memory (RAM), a magnetic or optical memory device (e.g., disk), a magnetic tape, a solid-state drive and the like. It is further noted that memory medium 107 may be housed in a common controller housing with the one or more processors 105. In embodiments, the memory medium 107 may be located remotely with respect to the physical location of the one or more processors 105 and controller 101. For instance, the one or more processors 105 of controller 101 may access a remote memory (e.g., server), accessible through a network (e.g., internet, intranet and the like).

In embodiments, a user interface is communicatively coupled to the controller 101. In embodiments, the user interface 110 may include, but is not limited to, one or more desktops, laptops, tablets, and the like. In another embodiment, the user interface 110 includes a display used to display data of the system 100 to a user. The display of the user interface 110 may include any display known in the art. For example, the display may include, but is not limited to, a liquid crystal display (LCD), an organic light-emitting diode (OLED) based display, or a CRT display. Those skilled in the art should recognize that any display device capable of integration with a user interface 110 is suitable for implementation in the present disclosure. In another embodiment, a user may input selections and/or instructions responsive to data displayed to the user via a user input device of the user interface 110.

Figure 1C:
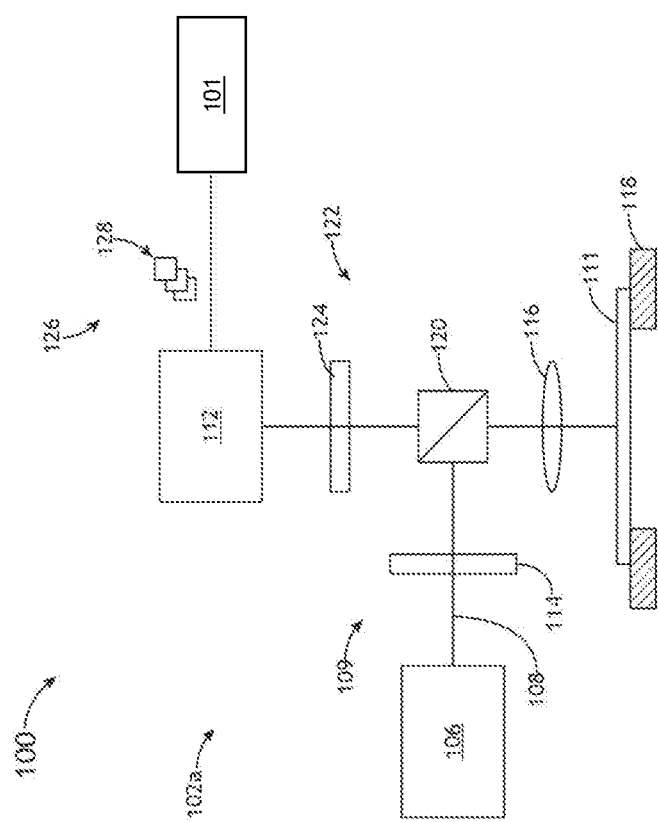
FIG. 1C is a simplified schematic view of an image-based optical inspection system, in accordance with one or more embodiments of the present disclosure.

FIG. 1C illustrates a simplified schematic view of the image-based optical imaging system 100, in accordance with one or more embodiments of the present disclosure.

Inspection sub-systems are further described in U.S. patent application Ser. No. 16/572,971, published as US 2020/0143528, by Ramaprasad Kulkarni, which is incorporated herein by in its entirety.

The inspection sub-system 102 may include any inspection sub-system known in the art including, but not limited to, an imaging-based optical inspection sub-system. For the purposes of the present disclosure, the term 'metrology tool' is interchangeable with 'inspection sub-system.' In this sense, a metrology tool and the controller 101 may form the system 100. Furthermore, the inspection sub-system 102 may include any type of optical metrology tool known in the art suitable for generating metrology data.

In embodiments, the inspection sub-system 102 includes an illumination source 106 configured to generate an illumination beam 108. The illumination beam 108 may include one or more selected wavelengths of light including, but not limited to, vacuum ultraviolet radiation (VUV), deep ultraviolet radiation (DUV), ultraviolet (UV) radiation, visible radiation, or infrared (IR) radiation. The illumination source 106 may further generate an illumination beam 108 including any range of selected wavelengths. In another embodiment, the illumination source 106 may include a spectrally-tunable illumination source to generate an illumination beam 108 having a tunable spectrum.

The illumination source 106 may further produce an illumination beam 108 having any temporal profile. For example, the illumination source 106 may produce a continuous illumination beam 108, a pulsed illumination beam 108, or a modulated illumination beam 108. Additionally, the illumination beam 108 may be delivered from the illumination source 106 via free-space propagation or guided light (e.g. an optical fiber, a light pipe, or the like).

In another embodiment, the illumination source 106 directs the illumination beam 108 to a sample 111 via an illumination pathway 109. The illumination pathway 109 may include illumination optical components 114 suitable for modifying and/or conditioning the illumination beam 108. For example, the one or more illumination optical components 114 may include, but are not limited to, one or more lenses, one or more polarizers, one or more filters, one or more diffusers, one or more homogenizers, one or more apodizers, one or more beam shapers, or one or more shutters (e.g., mechanical shutters, electro-optical shutters, acousto-optical shutters, or the like). By way of another example, the one or more illumination optical components 114 may include aperture stops to control the angle of illumination on the sample 111 and/or field stops to control the spatial extent of illumination on the sample 111. In another embodiment, the system 100 includes a beam splitter 120. In another embodiment, the system 100 includes an objective lens 116 to focus the illumination beam 108 onto the sample 111.

In another embodiment, the sample 111 is disposed on a sample stage 118. The sample stage 118 may include any device suitable for positioning the sample 111 within the system 100. For example, the sample stage 118 may include any combination of linear translation stages, rotational stages, tip/tilt stages or the like.

In another embodiment, a detector 112 is configured to capture radiation emanating from the sample 111 through a collection pathway 122. For example, the collection pathway 122 may include, but is not required to include, a collection lens (e.g., the objective lens 116 as illustrated in FIG. 1B). In this regard, a detector 112 may receive radiation reflected or scattered (e.g., via specular reflection, diffuse reflection, and the like) from the sample 111 or generated by the sample 111 (e.g., luminescence associated with absorption of the illumination beam 108, or the like).

The collection pathway 122 may further include any number of collection optical components 124 to direct and/or modify illumination collected by the objective lens 116 including, but not limited to one or more collection pathway lenses, one or more filters, one or more polarizers, or one or more beam blocks. Additionally, the collection pathway 122 may include field stops to control the spatial extent of the sample imaged onto the detector 112 or aperture stops to control the angular extent of illumination from the sample used to generate an image on the detector 112. In another embodiment, the collection pathway 122 includes an aperture stop located in a plane conjugate to the back focal plane of an optical element the objective lens 116 to provide telecentric imaging of the sample. In embodiments, the inspection sub-system 102 includes the beamsplitter 120 oriented such that the objective lens 116 may simultaneously direct the illumination beam 108 to the sample 111 and collect radiation emanating from the sample 111.

The detector 112 may include any type of optical detector known in the art suitable for measuring illumination received from the sample 111. For example, the detector 112 may include, but is not limited to, a charge-coupled device (CCD) detector, a time delay integration (TDI) detector, a photomultiplier tube (PMT), an avalanche photodiode (APD), a complementary metal-oxide-semiconductor (CMOS) sensor, or the like. In another embodiment, the detector 112 may include a spectroscopic detector suitable for identifying wavelengths of light emanating from the sample 111.

In embodiments, the controller 101 is communicatively coupled to the detector 112. Accordingly, the controller 101 may receive a dataset 126 from the detector 112. The dataset 126 may include one or more images 128 taken at an optical mode of the inspection sub-system 102. The dataset 126 may be generated by receiving a plurality of images from at least a portion of the sample 111 and/or from multiple samples (e.g., a die or a die row of a sample). For example, the plurality of images may be taken during a defect inspection test. Such defect inspection test may be performed while the inspection sub-system 102 is configured with an optical mode (e.g., such that the optical mode may be associated with the images 128 in the dataset 126).

In embodiments, the dataset may further include defect data associated with the one or more images 128. Such defect data may include one or more defects detected on the sample (e.g., pixel level information of the sample from an electron beam tool or other tool). In embodiments, the controller 101 may receive at least a portion of the dataset 126 from another inspection tool (e.g., receive the defect data from an electron beam inspection (EBI) tool or other tool). Such defect data may then be associated with the one or more images 128, such that a defect detection model may be trained with a location of a defect on the image using the defect data.

In embodiments, the dataset 126 may be stored in and received from the memory 107. As may be understood, any number of optical modes, images, and defect data may be accumulated in the dataset 126 and subsequently the memory 107.

In embodiments, the defect detection model 104 may be determined to have desirable qualities (e.g., a sensitivity or a stability) when trained with a combination of one or more optical modes. The combination of one or more optical modes may be determined by the mode selection model 103. The mode selection model 103 may determine the combination of one or more optical modes by selecting a portion of the dataset 126 with which to train the defect detection model 104. The portion of the dataset 126 used to train the defect detection model 104 may include images taken from an area of a sample which has been previously imaged (e.g., at a different optical mode) or from an area of a sample which has not been previously imaged. Where the image used to train the defect detection model 104 is taken from an area of a sample which has been previously used to train the defect detection model 104, a sensitivity of the defect detection model 104 may be evaluated. Where the image is taken from an area of a sample which has not been previously used, a stability of the defect detection model 104 may be evaluated. As may be understood, the defect detection model 104 should be trained for both stability and sensitivity.

In embodiments, the controller 101 may determine that the dataset 126 does not include a sufficient amount of defect data. The controller 101 may then receive additional defect data from a coupling with the electron beam inspection (EBI) or other such tool.

In embodiments, the controller 101 may also determine that the dataset 126 does not include a sufficient number of images (e.g., data for a desired optical mode), the controller may provide the desired optical mode (e.g., a recipe) to the inspection sub-system 102. The inspection sub-system 102 may then be configured according to the desired optical mode and one or more images may be taken at the desired optical mode. Similarly, the controller 101 may determine a portion of the sample 111 over which to image or a different sample over which to image and provide such information to the inspection sub-system 102. Such determination of the portion may be based, at least in part on, defect data regarding defects detected by the additional tool, (e.g., the EBI tool) and may optionally include care area analysis. The ability to provide additional desired optical modes or portions of the sample may ensure a data sufficiency when training the mode selection model 103 and the defect detection model 104.

Figure 2A:
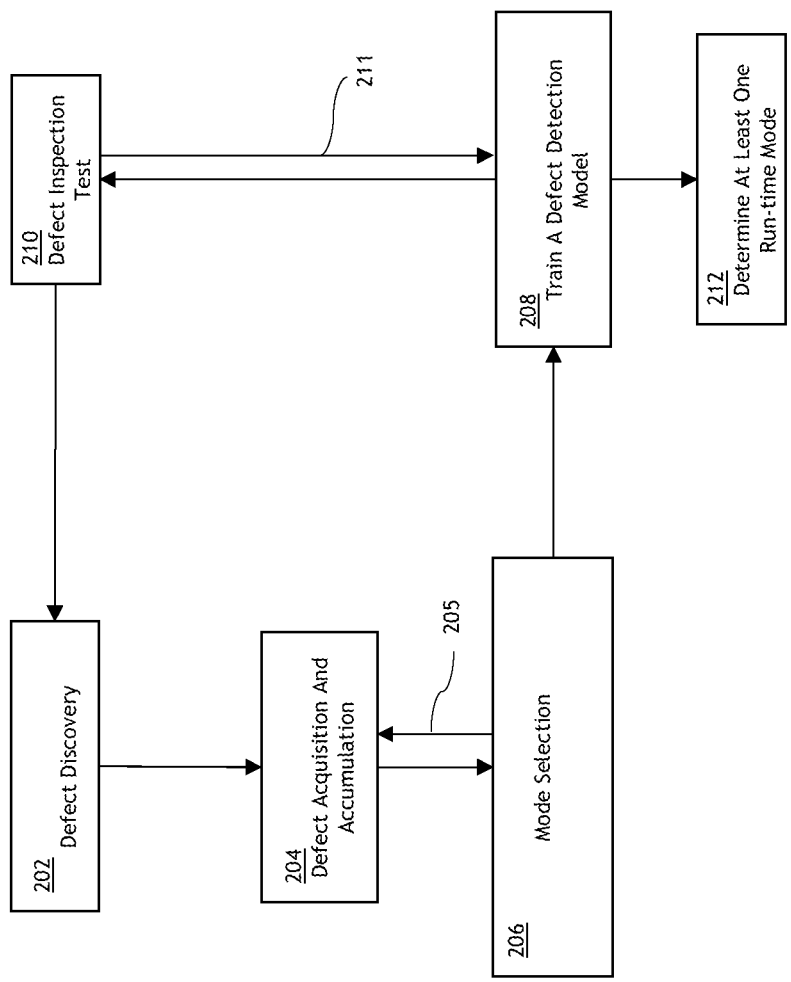
FIGS. 2A-2B depict a flow diagram of a method of joint defect discovery and optical mode selection, in accordance with one or more embodiments of the present disclosure.
Figure 2B:
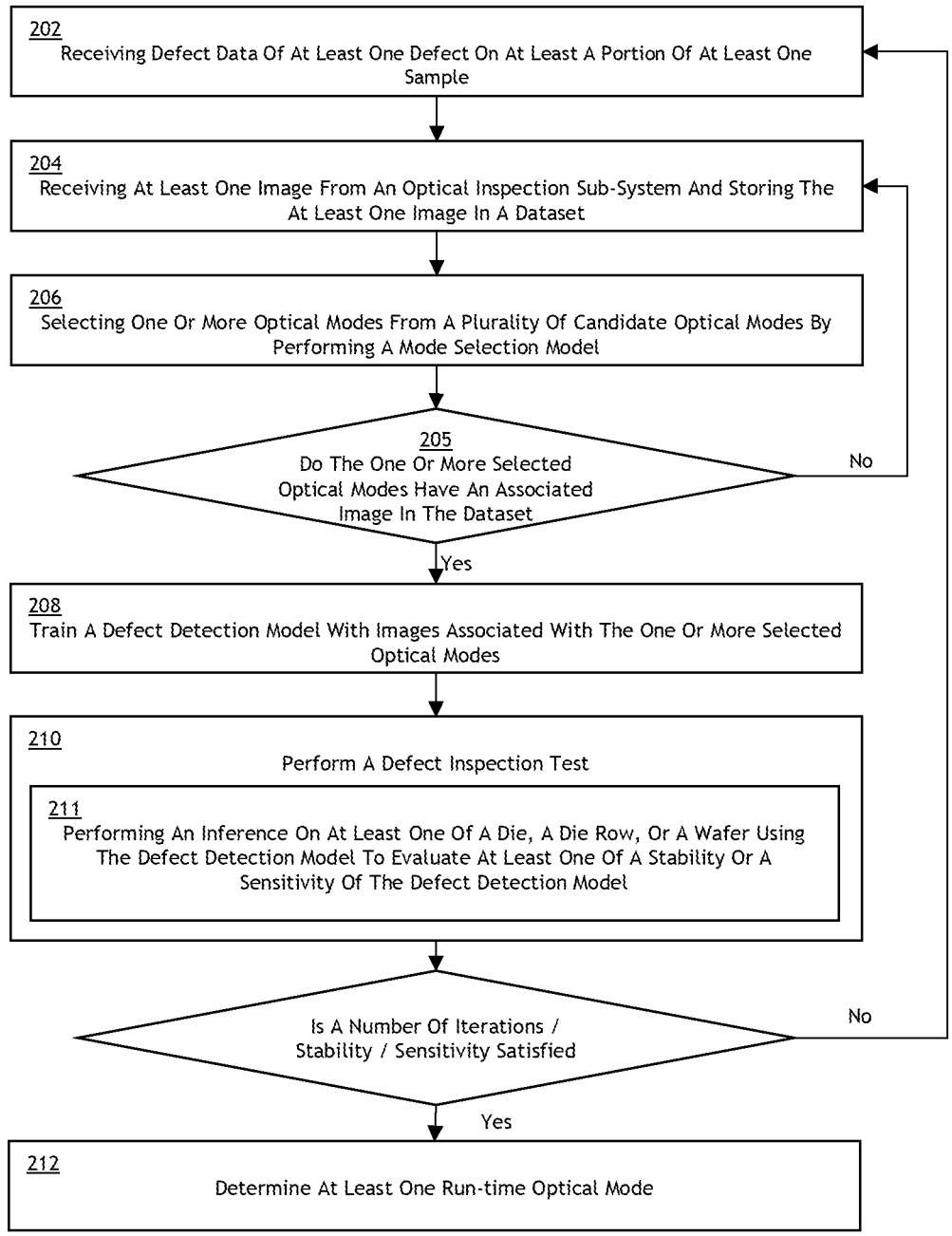

FIGS. 2A-2B depict flow diagrams illustrating steps performed in a method 200 for performing joint defect discovery and optical mode selection, in accordance with one or more embodiments of the present disclosure. The embodiments and the enabling technologies described previously herein in the context of system 100 should be interpreted to extend to the method 200. It is further recognized, however, that the method 200 is not limited to the system 100.

Using the method 200, a plurality of candidate optical modes (e.g., several hundred or more modes of the inspection sub-system or from a plurality of physical tools) may be narrowed down to one or more run-time modes. The run-time mode may include a combination of machine settings, such as, but not limited to, a wavelength, polarization, focal length, bandwidth, aperture, transmission distribution in an illumination aperture, transmission distribution in a collection aperture, and phase-shift distribution in the collection aperture, which are suitable for imaging one or more defects. Furthermore, by the method 200 a defect detection model may be trained for the run-time mode.

In embodiments, the method 200 includes a step 202 of defect discovery. The defect discovery step 202 may include receiving defect data of at least one defect on at least a portion of at least one sample. The defect may be detected on one or more images generated by any source including, but not limited to, an optical inspection tool (e.g., inspection sub-system 102), an electron beam inspection tool, a transmission electron microscopy tool (TEM), or a broadband plasma (BBP) inspection tool. Such images may be suitable for finding one or more defects on the sample, such as, but not limited to, voids, protrusions, or bridges. The defects may be detected on the one or more images by a conventional detection and image processing algorithm, a pre-trained defect discovery model (e.g., a neural network, a deep learning model, etc.), or may be detected by a defect discovery model trained during the method 200. For example, defects associated with the defect discovery step 202 may be identified in an inspection of one or more dies or die rows of a sample with the defect detection model (e.g., by a die/die row of the defect inspection test of step 210). The defect discovery may be performed on one or more portions of a sample (e.g., sample 111), until a sufficient number of defects are discovered, such as, but not limited to, up to 30 defects, or more. Furthermore, defect discovery may be performed on multiple samples (e.g., dies, die rows, or wafers).

In embodiments, the method 200 includes a step 204 of defect acquisition and accumulation. The defect acquisition and accumulation step 204 may include receiving at least one image taken by the inspection sub-system 102 while configured according to a candidate optical mode, and storing such image in a dataset. The dataset may include four-dimensional (4D) tensor data (or other such dimensional array). The tensor data may include any suitable format, such as a (N, W, H, C) format, corresponding to a number of images in a batch, a width of an image, a height of an image, and a number of channels in an image (e.g., a channel for greyscale, three channels for a Red-Green-Blue (RGB), etc.). The dataset may additionally be associated with the defects detected in the defect discovery step 202 (e.g., based on a location of the defects on the sample). In this regard, the at least one image may be from at least a portion of the at least one sample for which at least one defect was received.

In embodiments, the method 200 includes a step 206 of mode selection of one or more optical modes. The mode selection of one or more optical modes of step 206 may include performing a mode selection model (e.g., mode selection model 103) to select one or more optical modes of a plurality of candidate optical modes. The one or more modes may be selected from a list of candidate modes. The list of candidate modes may include only modes associated with defect data in the dataset 126. Alternatively, the list of candidate modes may include modes additional to those included in the dataset (e.g., where the mode selection model is configured to select modes by interpolation). Where the list of candidate modes includes modes additional to those included in the dataset, additional image collection may be required (e.g., by the step 205).

In embodiments, the method 200 may optionally include a step 205 of configuring the inspection sub-system with a selected optical mode and receiving an image taken at the selected optical mode. The step 205 may be performed after the step 206 (e.g., after a mode selection model selects one or more modes). In this regard, the mode selection model may be configured to select one or more optical modes which do not have an associated image in the dataset (e.g., the dataset does not include an image of all candidate modes due to a data insufficiency; where such mode selection model may be configured to select a mode which does not have an image by interpolation). To address the data insufficiency, the inspection sub-system may be configured with the selected optical modes and one or more images may be taken.

The mode selection model used in the step 206 may include at least one of a random channel dropout vector, a sparse vector, a model agnostic meta-learning algorithm, a forward selection algorithm, or a backward selection algorithm. These mode selection models are discussed further herein.

In embodiments, the method 200 includes a step 208 of training a defect detection model given the selected modes. The training the defect detection model step 208 may include providing the dataset (e.g., the images taken at the desired optical modes and the defect data) associated with the selected modes to the defect detection model. The defect detection model may be trained with the dataset according to any suitable method, such as, but not limited to, a neural network. The neural network may include at least one of a deep generative model, a convolutional neural network (CNN), a generative adversarial network (GAN), a conditional generative adversarial network (cGAN), a variational autoencoder (VAE), a representation learning network, or a transformer model (e.g., a Bidirectional Encoder Representations from Transformers (BERT); Generative Pre-Trained Transformer (GPT), etc.).

In embodiments, the method 200 includes a step 210 of performing a defect inspection test. The defect inspection test may include inspecting one or more areas of one or more samples. In this regard, images of the one or more samples may be taken by an inspection tool, such as, but not limited to, the inspection sub-system (e.g., inspection sub-system 102), an electron beam inspection (EBI) tool, a broadband plasma (BBP) inspection tool, or a transmission electron microscopy (TEM) tool. The image may be taken from an area of a sample (e.g., sample 111) which has been previously imaged (e.g., to evaluate a stability of the defect detection model) or an area of a sample which has not been previously imaged (e.g., to evaluate a sensitivity of the defect detection model). Where the sample is taken from an area of a sample which has not been previously imaged, the area may be from the same sample or from a new sample (e.g., a die, a die row, or a wafer).

In embodiments, the method 200 may include a step 211 of performing an inference on at least one of a die, a die row, or a wafer using the defect detection model to evaluate at least one of a stability or a sensitivity of the defect detection model. The defect detection model may be assessed by performing the inference at one or more of a die, a die row, or wafer scale. Results from the inference may be compared with one or more known defect locations (e.g., determined via an EBI tool, a TEM tool, a EBR tool, etc.). Based on the inference, a sensitivity and a stability of the defect detection model may be assessed. Further training may be required for the defect detection model to detect defects for any given optical mode (e.g., of the candidate modes) with a given stability and sensitivity. Such training may occur by iterating through one or more steps of the method 200 until a stability or sensitivity criterion is met. Similarly, one or more steps of the method 200 may be iterated until a number of iterations criterion is met.

Measurement recipe optimization based on spectral sensitivity and process variation is described U.S. Pat. No. 10,354,929, by Stilian Ivanov Pandev, which is incorporated herein by reference in its entirety.

By the joint defect detection and optical mode selection, the defect detection model may be configured to detect defects in an image of a sample based on the one or more optical modes used to train the defect detection model. The defect detection model training may thus be trained without regard to process of record (POR). In this regard, the defect detection model (e.g., defect detection model 104) may detect additional pixels associated with one or more defects which are not dependent on a feature quality.

In embodiments, the method 200 includes a step 212 of determining at least one run-time optical mode. As may be understood, a fewest number of run-time optical modes is desirable. In one example, an optical mode is selected as the run-time optical mode. In another example, up to three optical modes are selected as the run-time optical modes. In this regard, the number of optical modes selected as run-time optical modes is not intended to be limiting. Rather any suitable number of optical modes may be selected as run-time optical modes. To determine the run-time optical mode(s), a ranking table may be generated. The ranking table may include one or more indicators. The defect detection model may be applied to the images in the dataset to determine defects for the images. Based at least in part on the determined defects, the indicators may be generated. Such indicators may be relevant to selecting the run-time optical mode from the optical modes in the dataset. For example, the indicators may include a Signal to Noise Ratio (SNR), a Receiver Operating Characteristics (ROC) curve, a Capture Rate, a Nuisance Rate, or a Computation Cost. In this regard, an optical mode may be selected based upon a desired application and/or indicators which are more relevant to a user. Algorithm selectors based on Image Frames is described in U.S. patent application Ser. No. 16/389,422, published as US 2020/0132610, by Bjorn Brauer, which is incorporated herein by reference in its entirety. The at least one run-time optical mode and the defect detection model may then be provided to the inspection sub-system during a run-time environment.

Figure 3:
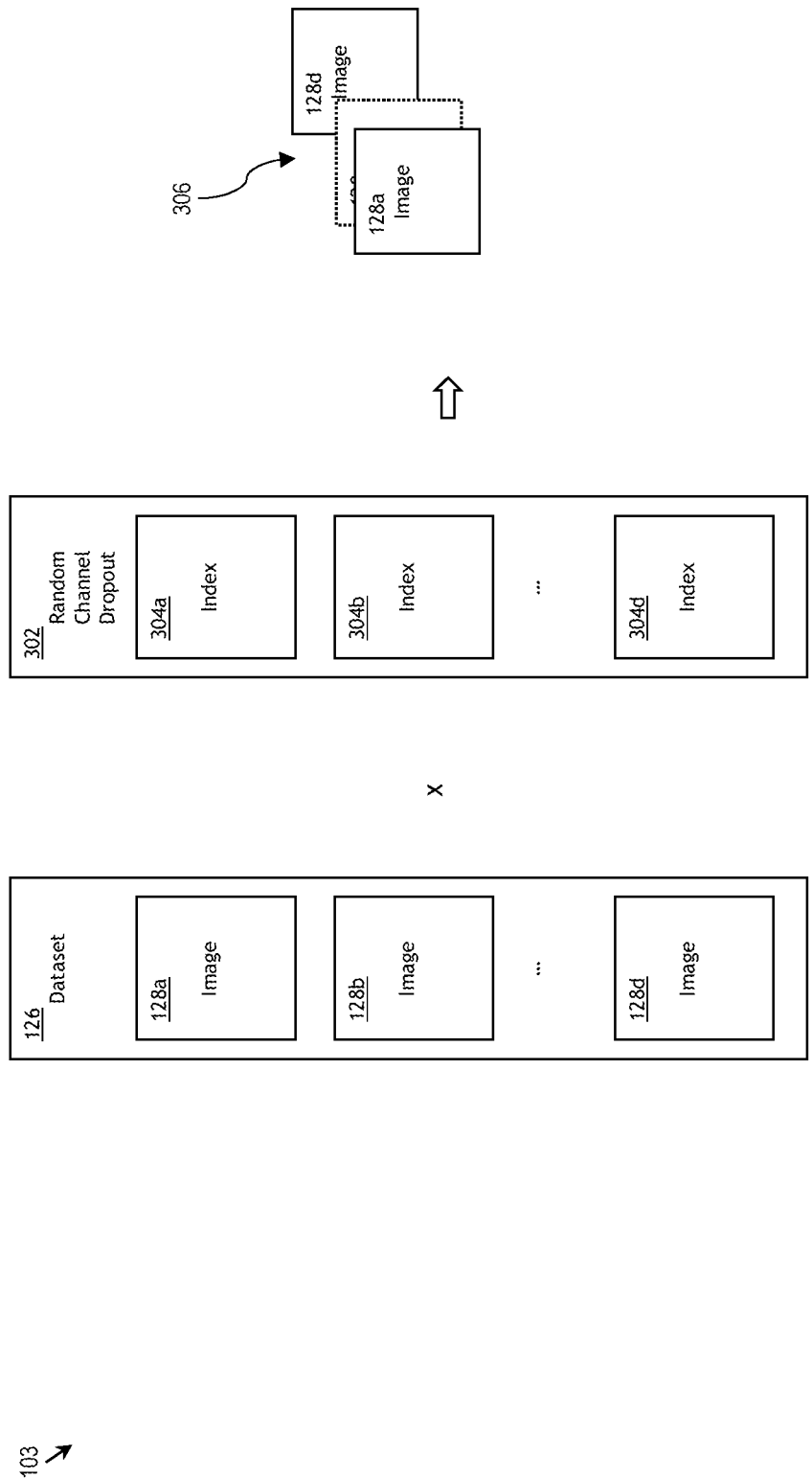
FIG. 3 depicts a mode selection model, in accordance with one or more embodiments of the present disclosure.
Figure 4:
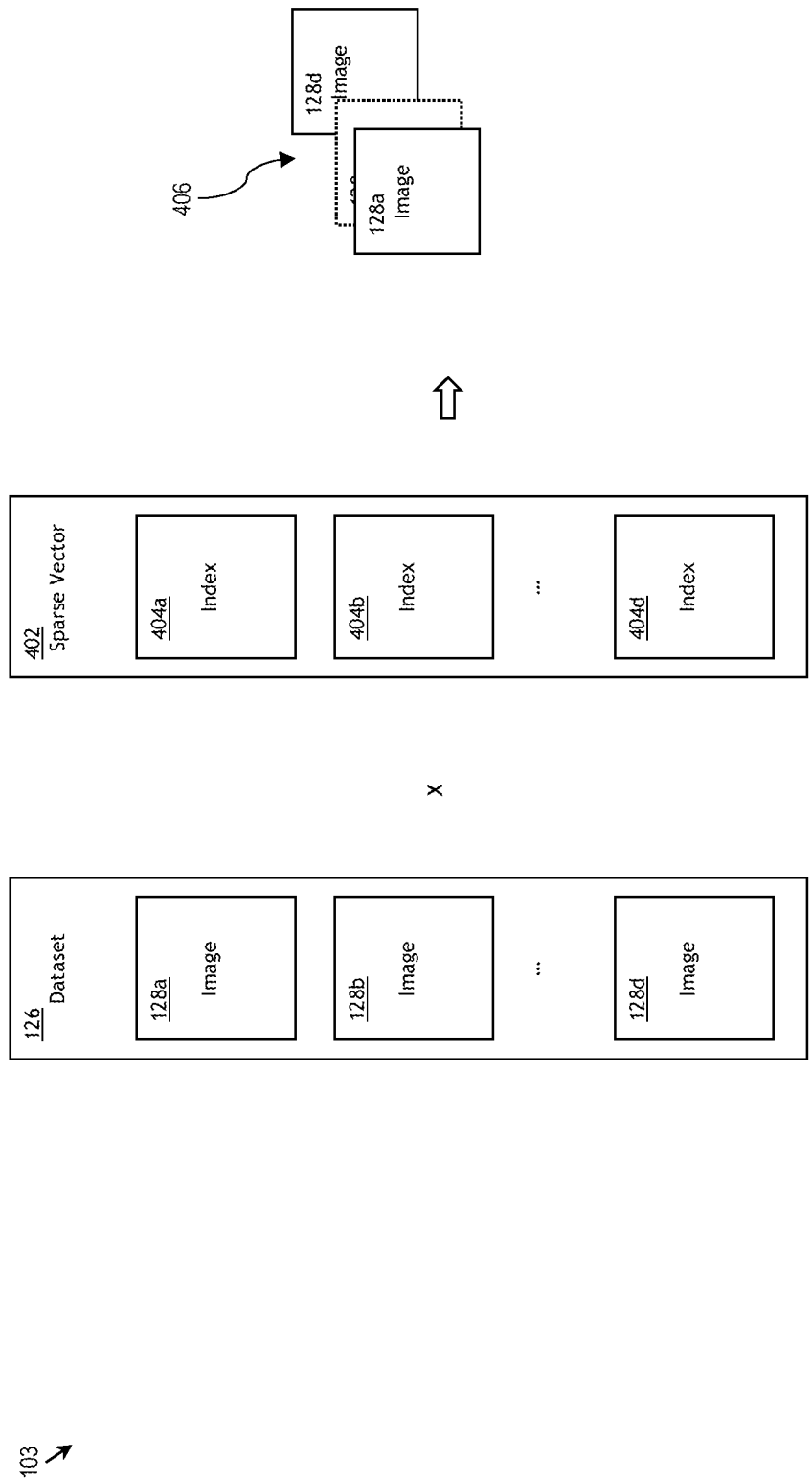
FIG. 4 depicts a mode selection model, in accordance with one or more embodiments of the present disclosure.

Referring now to FIGS. 3 and 4, various implementations of the mode selection model 103 (or e.g., the mode selection used in the step 206) are described in greater detail in accordance with one or more embodiments of the present disclosure. The mode selection model 103 may include one or more of a random channel dropout vector, a sparse vector, a model agnostic meta learning algorithm, a forward selection algorithm, or a backward selection algorithm.

FIG. 3 depicts the mode selection model 103, in accordance with one or more embodiments of the present disclosure.

In embodiments, the mode selection model 103 includes a grand model for random mode inputs which is learned based on the dataset 126. A set of modes may include a mode 1, mode 2, mode 3, mode 4, up to a mode n (e.g., candidate modes 1 through n). A subset of these modes may have defect data (e.g., a defect position) and associated images 128 taken by the inspection sub-system 102 while configured with the optical mode. Such defect data and associated images 128 may be stored in the dataset 126.

As depicted in FIG. 3, the mode selection model 103 may include a random channel dropout vector 302. The random channel dropout vector 302 may have a length equal to a number of indices 304a-304d. Such indices 304a-304d may be associated with optical modes having at least one image in the dataset 126 or may be associated with all candidate optical modes (e.g., where one or more of the candidate modes does not have an associated image in the dataset taken by the inspection sub-system while configured with the one or more candidate modes). The random channel dropout indices 304a-304d may include a mode selection value which is randomly generated with either a zero or a non-zero (e.g., one) value. Upon generating the random channel dropout vector 302, the random channel dropout vector 302 may be applied to the dataset 126 (e.g., a greyscale channel of the 4D tensor, one or more RGB channels of the 4D tensor, etc.) to determine a subset 306 of the dataset 126. In this regard, the subset 306 may include optical modes which have an associated non-zero random channel dropout index. Such subset 306 may then be provided to the defect detection model 104 for training the defect detection model 104, in accordance with one or more embodiments. Thus, the mode selection model 103 may handle all interested mode combinations (e.g., a list of candidate modes).

FIG. 4 depicts the mode selection model 103, in accordance with one or more embodiments of the present disclosure.

In embodiments, the mode selection model 103 includes learning based on a sparsity constraint. For example, a sparse vector 402 may have index values in a range (e.g., between zero and one). A length of the sparse vector 402 (e.g., a number of indices 404) may be equal to indices 404a-404d. Such indices 404a-404d may be associated with optical modes having at least one image in the dataset 126 or may be associated with all candidate optical modes. The sparse vector 402 may be applied to the dataset 126 to determine the subset 406 of the dataset 126, where the subset 406 is used for training the defect detection model 104 either by acting as a binary mode selection indicator or as a weighting vector.

In embodiments, the sparse vector 402 may be considered equivalent to a binary mode selection indicator. Initially (e.g., before thresholding), the sparse vector 402 may be determined by one or more sparse optimization techniques, such as, but not limited to, $L_1$ optimization or $L_\alpha$ optimization (e.g., where $0<\alpha<1$). The subset 406 then may be determined by comparing the sparse vector indices 404a-404d to a threshold (e.g., a threshold equal to 0.7). In this regard, any of the optical modes which have an associated sparse vector index 404a-404d which is greater than or equal to the threshold may be included in the subset 406 (e.g., a 4D tensor channel of the dataset). The subset 406 may then be provided to the defect detection model 104 for training. As may be understood, the threshold described herein is not intended to be limiting. In this regard, any number (e.g., between zero and one) may be a suitable threshold. Furthermore, the threshold should not be limited to a greater than or equal to value, unless otherwise noted. In this regard, the threshold may include any suitable inequality, such as, but not limited to, greater than, greater than or equal to, less than, or less than or equal to.

Although the sparse vector indices 404a-404d have been described as being equivalent to a binary mode selection indicator by comparing against a threshold to determine the subset 406, this is not intended to be limiting. In embodiments, the sparse vector indices 404a-404d may act as a weighting vector which is provided to the defect detection model 104 when training. In this regard, the defect detection model 104 may account for a weight of the sparse vector indices 404a-404d when using the images 128a-128d during defect detection model 104 training, such that the defect detection model 104 may be trained with all of the modes in the dataset 126. For example, a 4D tensor channel may be weighted based on the sparse vector indices 404a-404d when training the defect detection model 104.

The sparse vector indices 404a-404d may then be updated based on a defect inspection test (e.g., step 210 of performing a defect inspection test). If a defect detection model 104a has an improved stability or sensitivity as compared to defect detection models 104b or 104c, sparse vector indices used to train the defect detection model 104a may be increased. Where the defect detection model 104a has a reduced ability to detect defects, the sparse vector indices may be similarly reduced. Thus, the sparse vector indices 404a-404d may be updated to optimize a sensitivity and/or a stability of the defect detection model 104 under the selected sparse optimization technique (e.g., the $L_1$ or $L_\alpha$ optimization constraint).

Where the mode selection model 103 includes sparse vector 402, the run-time mode may optionally be selected by first applying a threshold to the dataset. In this regard, indices 404a-404d of the sparse vector 402 which exceed the threshold may be considered as most relevant modes. In some embodiments, the threshold may determine the run-time mode(s) directly (e.g., without further application of the defect detection model to generate a ranking table). This may occur where an index of the sparse vector 402 is high (e.g., close to one), indicating the associated optical mode is a best optical mode; or where all but a few (e.g., one or two) of the spare vector indices are low (e.g., close to zero). In other embodiments, the threshold may determine a plurality of most relevant modes (e.g., ten or more), indicating any of the plurality of most relevant modes may be a best optical mode, at which point a ranking table may be generated allowing a user to select a run-time mode from the plurality of most relevant modes.

Figure 5:
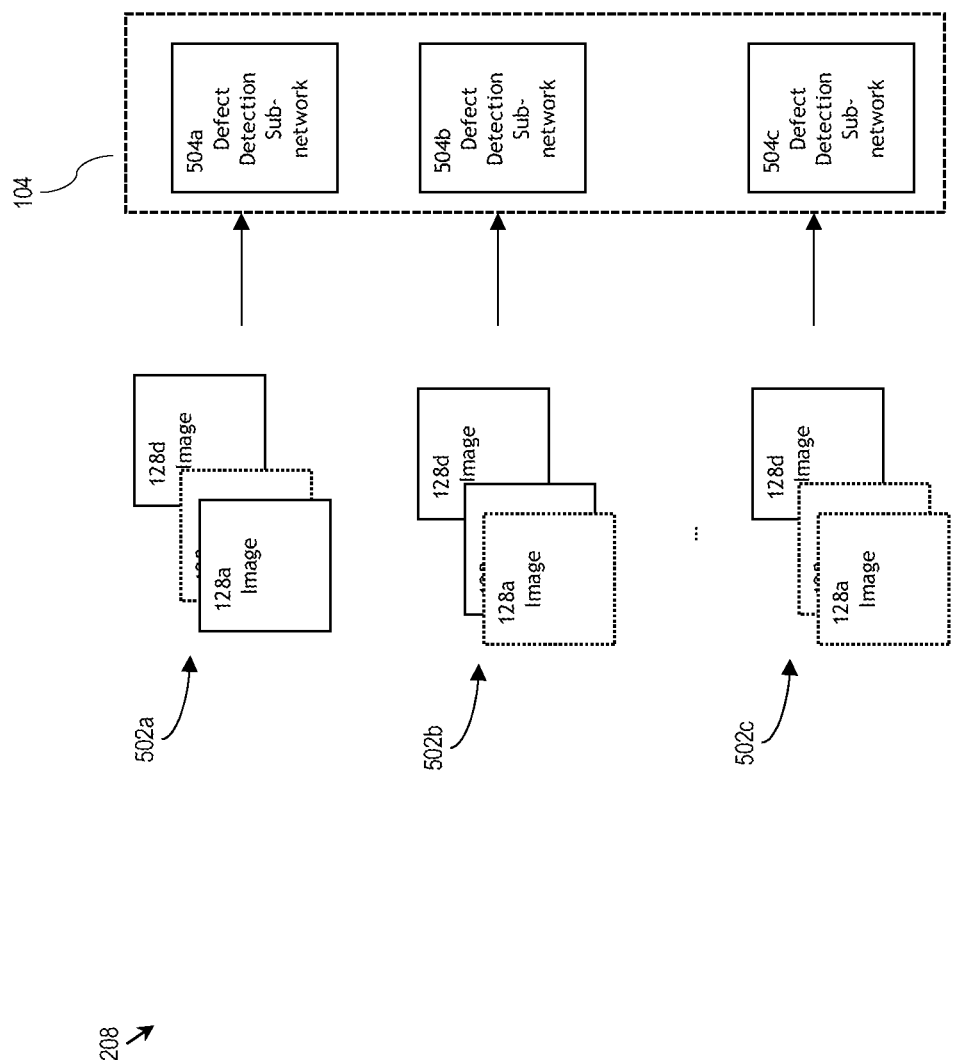
FIG. 5 depicts training a defect detection model, in accordance with one or more embodiments of the present disclosure.

FIG. 5 depicts the step 208 of training the defect detection model 104, in accordance with one or more embodiments of the present disclosure.

In embodiments, the defect detection model 104 is trained by a neural network. The neural network may include at least one of a deep generative model, a convolutional neural network (CNN), a generative adversarial network (GAN), a conditional generative adversarial network (cGAN), a variational autoencoder (VAE), a representation learning network, or a transformer model (e.g., a Bidirectional Encoder Representations from Transformers (BERT); Generative Pre-Trained Transformer (GPT), etc.).

The neural network may include a plurality of sub-networks which are trained on a subset of images 502a-502c associated with selected optical modes. Such subsets of images 502a-502c may be selected by the mode selection model based on at least one of, the random channel dropout vector 302, the sparse vector 402, or the model agnostic meta learning algorithm. Each subset of images 502a-502c may include four-dimensional (4D) tensor data (or other such dimensional array). The tensor data may include any suitable format, such as a (N, W, H, C) format, corresponding to a number of images in a batch, a width of an image, a height of an image, and a number of channels in an image (e.g., a channel for greyscale, three channels for a Red-Green-Blue (RGB), etc.). Given the 4D tensor data, the neural network may train the defect detection model 104 to detect defects.

Systems and methods incorporating a neural network and a forward physical model for semiconductor applications is described in U.S. Pat. No. 10,346,740, by Jing Zhang, which is incorporated herein by reference in its entirety. Diagnostic systems and methods for deep learning models configured for semiconductor applications is described in U.S. patent application Ser. No. 15/694,719, published as US 2018/0107928, by Jing Zhang, which is incorporated herein by reference in its entirety.

In embodiments, the defect detection model 104 may be trained for a number of iterations. The number of iterations may correspond to a number of times the defect detection model 104 is trained with a combination of optical modes. In this regard, each mode in the dataset 126 may be provided to the defect detection model for learning for a given number of iterations.

Referring generally to FIGS. 1A-5, the system 100 and method 200 are described in further detail.

In embodiments, the system 100 is configured to perform the mode selection model 103 with both random channel dropout vector 302 and sparse vector 402. For example, the system 100 may use the sparse vector 402 to determine a first subset of modes which are relevant. Then, the system 100 may be configured to apply the random channel dropout vector 302 to further limit the number of relevant modes.

Although the mode selection model 103 has been described as including either a sparse vector 302 or a random channel dropout vector 402, this is not intended to be limiting. In this regard, the mode selection model 103 may be configured to select a subset of training data by Model Agnostic Meta-Learning (MAML). MAML is described in 'Model-Agnostic Meta-Learning for Fast Adaption of Deep Networks', by Chelsea Finn, which is incorporated herein by reference in its entirety.

The mode selection model 103 may also include a stepwise regression technique. For example, the mode selection model 103 may include forward selection. By the forward selection, a first optical mode may be selected, with such first optical mode having a desired quality (e.g., the defect detection model 104 has a desired stability and/or sensitivity when trained with the optical mode). An additional optical mode may be selected, such additional optical mode further cause an increase in a stability or a sensitivity of the defect detection model. By way of another example, the mode selection model 103 may include backward selection. The backward selection may begin training the defect detection model with all optical modes. A first optical mode may be removed, the removal of such first optical mode causing a least amount of decrease in the stability or the sensitivity of the defect detection model. The forward selection or the backward selection may be repeated for or until a desired number of optical modes are determined.

Although the mode selection model 103 may be configured to determine a run-time optical mode from every possible mode combination of the inspection sub-system 102, this is typically not feasible under time constraints. Therefore, limiting the mode selection model 103 to a number of candidate modes in which to configure the inspection sub-system 102 is desirable. In embodiments, a list of candidate modes is determined (e.g., by one or more of user or the controller 101). The list of candidate optical modes may be determined in part by a dimension reduction analysis. In this regard, one or more redundant modes may be removed. For example, the candidate modes may be determined by correlation analysis or principle component analysis. Correlation analysis may be performed by calculating a cross-correlation, such as a Pearson correction coefficient, between mode pairs. Any mode pairs with a high coefficient (redundant modes) are removed. Principle component analysis (PCA) may be performed by retaining high variant principle components. The number and configuration of modes described herein is not intended to be limiting.

In embodiments, the method 200 includes care area optimization. By the care area optimization, an area of the sample may be selected as a care area, which has one or more suitable defects for joint optical selection and defect detection. One or more additional images may be taken from the care area for training the defect detection model. Design and noise-based care areas are described in U.S. patent application Ser. No. 16/364,161, Published as US 2020/0126212, by Brian Duffy, where is incorporated herein by reference in its entirety.

All of the methods described herein may include storing results of one or more steps of the method embodiments in memory. The results may include any of the results described herein and may be stored in any manner known in the art. The memory may include any memory described herein or any other suitable storage medium known in the art. After the results have been stored, the results can be accessed in the memory and used by any of the method or system embodiments described herein, formatted for display to a user, used by another software module, method, or system, and the like. Furthermore, the results may be stored "permanently," "semi-permanently," temporarily," or for some period of time. For example, the memory may be random access memory (RAM), and the results may not necessarily persist indefinitely in the memory.

It is further contemplated that each of the embodiments of the method described above may include any other step(s) of any other method(s) described herein. In addition, each of the embodiments of the method described above may be performed by any of the systems described herein.

As used throughout the present disclosure, the term "sample" generally refers to a substrate formed of a semiconductor or non-semiconductor material (e.g., a wafer, or the like). For example, a semiconductor or non-semiconductor material may include, but is not limited to, monocrystalline silicon, gallium arsenide, and indium phosphide. A sample may include one or more layers. For example, such layers may include, but are not limited to, a resist (including a photoresist), a dielectric material, a conductive material, and a semiconductive material. Many different types of such layers are known in the art, and the term sample as used herein is intended to encompass a sample on which all types of such layers may be formed. One or more layers formed on a sample may be patterned or unpatterned. For example, a sample may include a plurality of dies, each having repeatable patterned features. Formation and processing of such layers of material may ultimately result in completed devices. Many different types of devices may be formed on a sample, and the term sample as used herein is intended to encompass a sample on which any type of device known in the art is being fabricated. Further, for the purposes of the present disclosure, the term sample and wafer should be interpreted as interchangeable. In addition, for the purposes of the present disclosure, the terms patterning device, mask and reticle should be interpreted as interchangeable.

One skilled in the art will recognize that the herein described components operations, devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components, operations, devices, and objects should not be taken as limiting.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to physically mateable and/or physically interacting components and/or wirelessly interactable and/or wirelessly interacting components and/or logically interacting and/or logically interactable components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A system comprising:
  a controller communicatively coupled to an inspection sub-system, the inspection sub-system configured to image at least one sample while being configured with any of a plurality of candidate optical modes, the controller including one or more processors configured to execute program instructions causing the one or more processors to jointly perform optical mode selection and defect detection training by iteratively:
    receiving defect data of at least one defect on at least a portion of the at least one sample;
    receiving at least one image from the inspection sub-system and storing the at least one image in a dataset, wherein the at least one image is associated with the at least one defect detected on the at least the portion of the at least one sample by the inspection sub-system configured with a candidate optical mode of the plurality of candidate optical modes;
    selecting one or more optical modes from the plurality of candidate optical modes by performing a mode selection model; and
    training a defect detection model with images associated with the one or more selected optical modes;
  wherein the one or more processors are further configured to determine at least one run-time optical mode from the plurality of candidate optical modes.

2. The system of claim 1, wherein the mode selection model comprises:
  a sparse vector, the sparse vector including a plurality of indices, each of the plurality of indices including a mode selection weight between zero and a first value.

3. The system of claim 2, wherein the one or more optical modes selected by the mode selection model are selected by applying a threshold to the sparse vector.

4. The system of claim 2, wherein the one or more optical modes selected by the mode selection model are selected by providing the plurality of indices to the defect detection model as a weighting vector.

5. The system of claim 1, wherein the mode selection model comprises:
  a random channel dropout vector, the random channel dropout vector including a plurality of indices, each of the plurality of indices including a mode selection weight of either zero or non-zero.

6. The system of claim 5, wherein the plurality of indices are randomly set to either a zero or a non-zero value during each iteration.

7. The system of claim 6, wherein the one or more optical modes of the dataset in which to train the defect detection model are determined by the plurality of indices having the non-zero value.

8. The system of claim 1, wherein the mode selection model includes a model agnostic meta-learning algorithm.

9. The system of claim 1, wherein the mode selection model comprises at least one of forward selection or backward selection algorithm.

10. The system of claim 1, wherein determining the at least one run-time mode includes generating a ranking table, the ranking table including at least one of a signal to noise ratio, a receiver operating characteristic curve, a capture rate, a nuisance rate, or a computation cost.

11. The system of claim 1, wherein the plurality of candidate optical modes are determined by dimension reduction, the dimension reduction including at least one of correlation analysis or principle component analysis.

12. The system of claim 1, wherein each of the plurality of candidate optical modes includes a wavelength, a focal length, an aperture, and a bandwidth.

13. The system of claim 1, wherein the defect detection model includes at least one of a deep generative model, a convolutional neural network, a generative adversarial network, a conditional generative adversarial network, a variational autoencoder, a representation learning network, or a transformer model.

14. The system of claim 1, wherein the inspection sub-system includes a broadband plasma inspection tool.

15. The system of claim 1, further comprising performing a defect inspection test.

16. The system of claim 15, further comprising performing an inference using the defect detection model to evaluate at least one of a stability or a sensitivity of the defect detection model.

17. The system of claim 1, wherein the inspection sub-system is configured to image the at least one sample while configured with the one or more optical modes selected from the plurality of candidate modes by the mode selection model, when the one or more optical modes do not include an associated image in the dataset.

18. A method for performing optical mode selection and defect detection training comprising:
  receiving defect data of at least one defect on at least a portion of at least one sample;
  receiving at least one image from an inspection sub-system and storing the at least one image in a dataset, wherein the at least one image is associated with the at least one defect detected on the at least the portion of the at least one sample by the inspection sub-system configured with a candidate optical mode of a plurality of candidate optical modes;

selecting one or more optical modes from the plurality of candidate optical modes by performing a mode selection model;

training a defect detection model with the images associated with the one or more optical modes selected by the mode selection model; and performing a defect inspection test.

19. The method of claim 18, wherein the mode selection model includes one or more of a random channel dropout vector, a sparse vector, a model-agnostic meta learning algorithm, a forward selection algorithm, or a backward selection algorithm.

20. A system comprising:

an inspection sub-system configured to image at least one sample while being configured with a plurality of candidate optical modes;

a controller communicatively coupled to the inspection sub-system, the controller including one or more processors configured to execute program instructions causing the one or more processors to jointly perform optical mode selection and defect detection training by iteratively:

receiving defect data of at least one defect on at least a portion of the at least one sample;

receiving at least one image from the inspection sub-system and storing the at least one image in a dataset, wherein the at least one image is associated with the at least one defect detected on the at least the portion of the at least one sample by the inspection sub-system configured with a candidate optical mode of the plurality of candidate optical modes;

selecting one or more optical modes from the plurality of candidate optical modes by performing a mode selection model; and training a defect detection model with images associated with the one or more selected optical modes;

wherein the one or more processors are further configured to determine at least one run-time optical mode from the plurality of candidate optical modes.

* * * * *